(12) United States Patent
Hessler et al.

(10) Patent No.: US 10,090,906 B2
(45) Date of Patent: Oct. 2, 2018

(54) PMI REPORTING FOR A SET OF PORTS

(71) Applicant: Telefonaktiebolaget LM Ericsson (publ), Stockholm (SE)

(72) Inventors: Martin Hessler, Linköping (SE); Mirsad Cirkic, Linköping (SE); Erik Eriksson, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/522,842

(22) PCT Filed: Oct. 12, 2015

(86) PCT No.: PCT/SE2015/051081
§ 371 (c)(1),
(2) Date: Apr. 28, 2017

(87) PCT Pub. No.: WO2017/065652
PCT Pub. Date: Apr. 20, 2017

(65) Prior Publication Data
US 2017/0338879 A1    Nov. 23, 2017

(51) Int. Cl.
*H04L 1/02* (2006.01)
*H04B 7/06* (2006.01)
*H04B 7/0456* (2017.01)
*H04L 27/18* (2006.01)

(52) U.S. Cl.
CPC ......... *H04B 7/0639* (2013.01); *H04B 7/0456* (2013.01); *H04L 27/18* (2013.01)

(58) Field of Classification Search
CPC ....... H04L 27/18; H04L 67/1097; H04B 7/04; H04B 7/0456; H04B 7/0639
USPC .................. 375/267, 260, 340; 455/44, 337; 370/329
See application file for complete search history.

(56) References Cited

U.S. PATENT DOCUMENTS

| | | | |
|---|---|---|---|
| 2014/0086285 A1 | 3/2014 | Yang et al. | |
| 2015/0195071 A1* | 7/2015 | Lunttila | H04L 5/0053 370/329 |
| 2016/0188427 A1* | 6/2016 | Chandrashekar | G06F 11/2007 714/4.11 |

FOREIGN PATENT DOCUMENTS

| | | |
|---|---|---|
| WO | 2012144866 A1 | 10/2012 |
| WO | 2014023727 A1 | 2/2014 |

OTHER PUBLICATIONS

International Search Report and Written Opinion dated May 20, 2016 for International Application Serial No. PCT/SE2015/051081, International Filing Date: Oct. 12, 2015 consisting of 19-pages.

* cited by examiner

*Primary Examiner* — Khai Tran
(74) *Attorney, Agent, or Firm* — Christopher & Weisberg, P.A.

(57) ABSTRACT

There is provided mechanisms for precoding matrix indicator (PMI) reporting for a set of ports. A method is performed by a wireless device. The method comprises receiving reference signals, the reference signals having been transmitted from a set of ports of a network node. The method comprises determining PMI information for the received reference signals. The method comprises transmitting the PMI information in a report to the network node, wherein the report comprises a combination of identifications of ports from the set of ports and identifications of the reference signals such that an identification of each port is paired with a respective identification of at most one of the reference signals.

26 Claims, 6 Drawing Sheets

PMI REPORTING FOR A SET OF PORTS

CROSS-REFERENCE TO RELATED APPLICATION

This application is a Submission Under 35 U.S.C. § 371 for U.S. National Stage Patent Application of International Application Number: PCT/SE2015/051081, filed Oct. 12, 2015 entitled "PMI REPORTING FOR A SET OF PORTS," the entirety of which is incorporated herein by reference.

TECHNICAL FIELD

Embodiments presented herein relate to methods, a wireless device, a network node, computer programs, and a computer program product for precoding matrix indicator reporting for a set of ports.

BACKGROUND

In communications networks, there may be a challenge to obtain good performance and capacity for a given communications protocol, its parameters and the physical environment in which the communications network is deployed.

For example, the use of network nodes employing multi-antenna techniques has the potential to increase the performance of the communications network a whole order of magnitude. By spreading out the information to be communicated and the total transmission power wisely over multiple antennas, several gains can be harvested, such as increased spectral efficiency, reduced interference, increased link reliability in terms of diversity, and so on.

Communications networks employing network nodes with more than one transmit antenna can be categorized into two main groups based on how each antenna element can be controlled; digital beamforming and analogue beamforming, respectively.

With digital beamforming (DgBF) the transmitted signal from each antenna can be controlled arbitrarily. In the equivalent baseband model, this corresponds to sending a complex-valued symbol with arbitrary amplitude and phase from each of the antennas.

With analogue beamforming (AnBF) the transmitted signal from each antenna cannot be set to any arbitrary value due to simplified hardware. In the equivalent baseband model, the transmitted complex-valued symbols from the antennas have the same amplitude and only differ from one another in a fixed phase, linearly.

Precoding is a generalization of beamforming to support multi-stream (or multi-layer) transmission in multi-antenna wireless communications. Digital beamforming may be regarded as giving more freedom in selecting appropriate precoders but generally requires more advanced, and possibly more expensive, hardware. It is foreseen that in future radio systems, a combination of digital beamforming and analogue beamforming can be used. For example, an antenna array comprising antenna panels (herein also referred to as ports) can be individually controlled with AnBF and the antenna panels can be jointly controlled with DgBF. In other words, for the antennas in each antenna panel, AnBF can be applied, and for the groups of antennas (belonging to each antenna panel), DgBF can be applied.

In order to support multiple-input multiple-output (MIMO) communications, for example, in Long Term Evolution Frequency-Division (LTE FDD) the wireless device can be configured to report which precoding and rank the wireless device estimates is best to use. To limit the overhead of the reporting only a set of precoders are possible to report for the wireless device. The precoders are associated with reference signals transmitted by the radio access network node. The set of available precoders is denoted a codebook, which is reported using an index and a rank, e.g. a Precoder Matrix indicator (PMI) and a Rank Indicator (RI). The PMI thus refers to reference signals transmitted by the radio access network node and may hence be regarded as a means for the wireless device to report the reference signals.

However, there is still a need for an improved handling of reference signal reporting.

SUMMARY

An object of embodiments herein is to provide efficient handling of reference signal reporting.

According to a first aspect there is presented a method for precoding matrix indicator (PMI) reporting for a set of ports. The method is performed by a wireless device. The method comprises receiving reference signals, the reference signals having been transmitted from a set of ports of a network node. The method comprises determining PMI information for the received reference signals. The method comprises transmitting the PMI information in a report to the network node, wherein the report comprises a combination of identifications of ports from the set of ports and identifications of the reference signals such that an identification of each port is paired with a respective identification of at most one of the reference signals.

According to a second aspect there is presented a wireless device for PMI reporting for a set of ports. The wireless device comprises processing circuitry. The processing circuitry is configured to cause the wireless device to receive reference signals, the reference signals having been transmitted from a set of ports of a network node. The processing circuitry is configured to cause the wireless device to determine PMI information for the received reference signals. The processing circuitry is configured to cause the wireless device to transmit the PMI information in a report to the network node, wherein the report comprises a combination of identifications of ports from the set of ports and identifications of the reference signals such that an identification of each port is paired with a respective identification of at most one of the reference signals.

According to a third aspect there is presented a computer program for PMI reporting for a set of ports, the computer program comprising computer program code which, when run on processing circuitry of a wireless device, causes the wireless device to perform a method according to the first aspect.

According to a fourth aspect there is presented a method for PMI reporting for a set of ports. The method is performed by a network node. The method comprises transmitting reference signals on a set of ports. The method comprises receiving PMI information in a report from a wireless device for the set of ports. The report comprises a combination of identifications of ports from the set of ports and identifications of the reference signals such that an identification of each port is paired with a respective identification of at most one of the reference signals.

According to a fifth aspect there is presented a network node for PMI reporting for a set of ports. The network node comprises processing circuitry. The processing circuitry is configured to cause the network node to transmit reference signals on a set of ports. The processing circuitry is configured to cause the network node to receive PMI information in a report from a wireless device for the set of ports. The report comprises a combination of identifications of ports from the set of ports and identifications of the reference signals such that an identification of each port is paired with a respective identification of at most one of the reference signals.

According to a sixth aspect there is presented a computer program for PMI reporting for a set of ports, the computer program comprising computer program code which, when run on processing circuitry of a network node, causes the network node to perform a method according to the fourth aspect.

According to a seventh aspect there is presented a computer program product comprising a computer program according to at least one of the third aspect and the sixth aspect and a computer readable means on which the computer program is stored.

Advantageously the above disclosed methods, wireless device, network node, computer programs, and computer program product provides efficient reporting of PMI information.

Advantageously the above disclosed methods, wireless device, network node, computer programs, and computer program product makes it possible for the wireless device to perform a simultaneous beam scanning and PMI reporting procedure for a set of ports with a flexible beam-forming. This in turn enables the use of simplified hardware where different beam directions are possible, but where simultaneous use of two or more beam directions is not possible. Hence, the herein disclosed method for PMI reporting captures hardware architecture restrictions whilst enabling precoder selection to capture multipath propagations.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
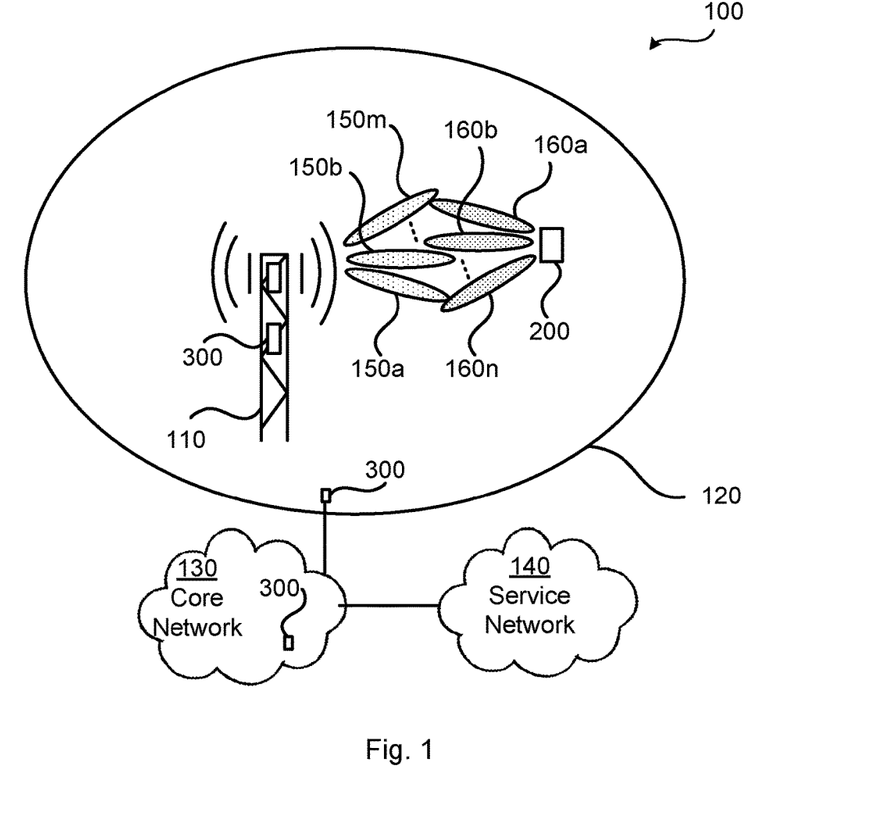
FIG. 1 is a schematic diagram illustrating a communication network according to embodiments.

FIG. 1 is a schematic diagram illustrating a communications network 100 where embodiments presented herein can be applied. The communications network 100 comprises a radio access network node 110 providing network access to a wireless device 200 within a cell, or coverage region, 120 by means of transmitting and receiving signals in an antenna system in m directional beams 150a, 150b, . . . , 150m. The radio access network node 110 can be a radio base station, a base transceiver station, a node B, an evolved node B, or an access point. The wireless device 200 transmits and receives signals in an antenna system in n directional beams 160a, 160b, . . . , 160n. The wireless device 200 may be a portable wireless device, a mobile station, a mobile phone, a handset, a wireless local loop phone, a user equipment (UE), a smartphone, a laptop computer, a tablet computer, a wireless modem, or a sensor device.

The radio access network node 110 is operatively connected to a core network 130, and the core network is in turn operatively connected to a service network 140, such as the Internet. A wireless device 200 having an operative connection to the radio access network node 120 may thereby exchange data (i.e., receive data packets and send data packets) and access services provided by the service network 140.

The communications network 100 further comprises a network node 300. As illustrated in FIG. 1, the network node 300 may be located in the radio access network, for example being co-located with the radio access network node 110, or be provided in the core network 130. The network node 300 will be further described below.

Using AnBF (see above) a particular antenna port (antenna panel) can be configured with different directional beams, but it is not possible to simultaneously transmit signals in two or more different directions at the same time. This is the case since in AnBF only a linear phase-offset between the antenna elements of the panel can be varied, and hence the antenna panel can only point in one spatial direction at a time. This is not a limitation in DgBF, but in the considered communications network 100 it is assumed that DgBF can only be applied over groups of antennas (antenna panels), and only AnBF can be applied on each individual antenna panel, which limits the number of simultaneous spatial directions the antenna system can provide. This is the case even though the antenna system has a large number of antennas.

Figure 9:
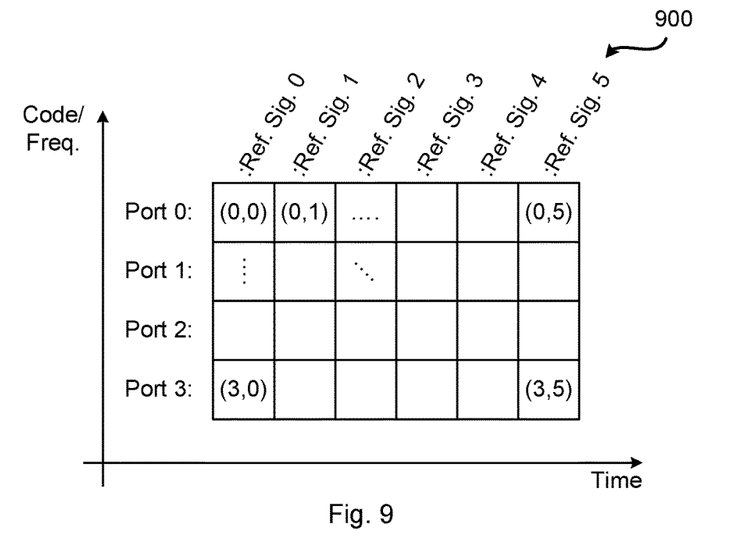
FIG. 9 is a schematic illustration of a precoding matrix indicator array according to an embodiment.

According to the state of the art the wireless device 200 will be asked to report a PMI on a set of reference signals transmitted by the radio access network node 110. In a beam scanning procedure the radio access network node 110 thus transmits reference signals on the directional beams 150a-150m for a particular antenna port. The wireless device 200 then reports which beam reference signal the wireless device 200 prefers for each antenna port and also a PMI for each reference signal. The PMI refers to an index to a precoder combining the reference signals into one or multiple data streams. FIG. 9 schematically illustrates a matrix representation of a PMI report 900 as obtained by means of scanning for reference signals 0, 1, . . . , M (where M=5 in FIG. 9) over ports 0, 1, . . . , N (where N=3 in FIG. 9). Each reference signals may be transmitted in a separate beam and hence reference signals 0, 1, . . . , M may correspond to directional beams 0, 1, . . . , M.

However, taking into account the above described limitation that different reference signals from the same antenna panel is not possible to combine, the radio access network node 110 would need to limit the reference signals to a set of references signals that is possible for the wireless device 200 to combine, e.g. one reference signal per antenna panel. Hence a time consuming and inefficient search would be necessary in order for the wireless device 200 to report the PMI.

The embodiments disclosed herein thus relate to mechanisms for PMI reporting for a set of ports. In order to obtain such mechanisms there is provided a wireless device 200, a method performed by the wireless device 200, a computer program product comprising code, for example in the form of a computer program, that when run on processing circuitry of the wireless device 200, causes the wireless device 200 to perform the method. In order to obtain such mechanisms there is further provided a network node 300, a method performed by the network node 300, and a computer program product comprising code, for example in the form of a computer program, that when run on processing circuitry of the network node 300, causes the network node 300 to perform the method.

Figure 2A:
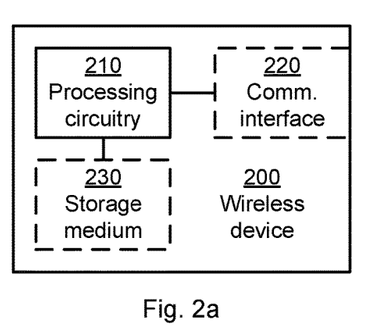
FIG. 2a is a schematic diagram showing functional units of a wireless device according to an embodiment.

FIG. 2a schematically illustrates, in terms of a number of functional units, the components of a wireless device 200 according to an embodiment. 3o Processing circuitry 210 is provided using any combination of one or more of a suitable central processing unit (CPU), multiprocessor, or microcontroller, digital signal processor (DSP), etc., capable of executing software instructions stored in a computer program product 410a (as in FIG. 4), e.g. in the form of a storage medium 230. The processing circuitry 210 may alternatively be provided by at least one application specific integrated circuit (ASIC), or at least one field programmable gate array (FPGA).

Particularly, the processing circuitry 210 is configured to cause the wireless device 200 to perform a set of operations, or steps, S102-S108. These operations, or steps, S102-S108 will be disclosed below. For example, the storage medium 230 may store the set of operations, and the processing circuitry 210 may be configured to retrieve the set of operations from the storage medium 230 to cause the wireless device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The wireless device 200 may further comprise a communications interface 220 for communications with at least one radio access network node 110 and at least one network node 300. As such the communications interface 220 may comprise one or more transmitters and receivers, comprising analogue and digital components and a suitable number of antennas for wireless communications and ports for wireline communications.

Figure 2B:
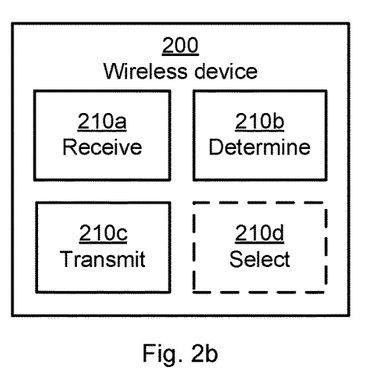
FIG. 2b is a schematic diagram showing functional modules of a wireless device according to an embodiment.

The processing circuitry 210 controls the general operation of the wireless device 200 e.g. by sending data and control signals to the communications interface 220 and the storage medium 230, by receiving data and reports from the communications interface 220, and by retrieving data and instructions from the storage medium 230. Other components, as well as the related functionality, of the wireless device 200 are omitted in order not to obscure the concepts presented herein. FIG. 2b schematically illustrates, in terms of a number of functional modules, the components of a wireless device 200 according to an embodiment. The wireless device 200 of FIG. 2b comprises a number of functional modules; a receive module 210a configured to perform below steps S102, S104, a determine module 210b configured to perform below steps S106, S106a, S106b, and a transmit module 210C configured to perform below step S108. The wireless device 200 of FIG. 2b may further comprise a number of optional functional modules, such as a select module 210d configured to perform below step S106c. The functionality of each functional module 210a-210d will be further disclosed below in the context of which the functional modules 210a-210d may be used. In general terms, each functional module 210a-210d may be implemented in hardware or in software. Preferably, one or more or all functional modules 210a-210d may be implemented by the processing circuitry 210, possibly in cooperation with functional units 220 and/or 230. The processing circuitry 210 may thus be arranged to from the storage medium 230 fetch instructions as provided by a functional module 210a-210d and to execute these instructions, thereby performing any steps as will be disclosed hereinafter.

Figure 3A:
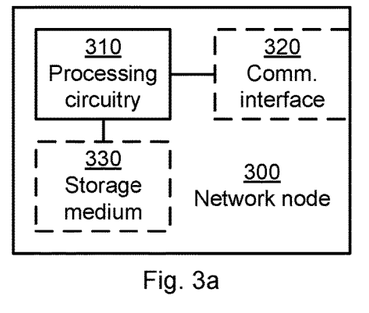
FIG. 3a is a schematic diagram showing functional units of a network node according to an embodiment.

FIG. 3a schematically illustrates, in terms of a number of functional units, the components of a network node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 410b (as in FIG. 4), e.g. in the form of a storage medium 330. The processing circuitry 310 may alternatively be provided by at least one application specific integrated circuit (ASIC), or at least one field programmable gate array (FPGA).

Particularly, the processing circuitry 310 is configured to cause the network node 300 to perform a set of operations, or steps, S202-S206. These operations, or steps, S202-S206 will be disclosed below. For example, the storage medium 330 may store the set of operations, and the processing circuitry 310 may be configured to retrieve the set of operations from the storage medium 330 to cause the network node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The network node 300 may further comprise a communications interface 320 for communications with at least one wireless device 200 and at least one radio access network node no, and, optionally entities and devices of the core network 130 and the service network 140. As such the communications interface 320 may comprise one or more transmitters and receivers, comprising analogue and digital components and a suitable number of antennas for wireless communications and ports for wireline communications.

The processing circuitry 310 controls the general operation of the network node 300 e.g. by sending data and control signals to the communications interface 320 and the storage medium 330, by receiving data and reports from the communications interface 320, and by retrieving data and instructions from the storage medium 330. Other components, as well as the related functionality, of the network node 300 are omitted in order not to obscure the concepts presented herein.

Figure 3B:
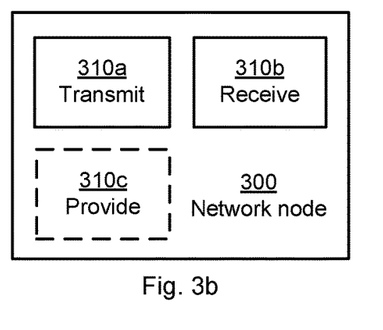
FIG. 3b is a schematic diagram showing functional modules of a network node according to an embodiment.

FIG. 3b schematically illustrates, in terms of a number of functional modules, the components of a network node 300 according to an embodiment. The network node 300 of FIG. 3b comprises a number of functional modules; a transmit module 310a configured to perform below step S204, and a receive module 310b configured to perform below step S206. The network node 300 of FIG. 3b may further comprises a number of optional functional modules, such as a provide module 310c configured to perform below step S202. The functionality of each functional module 310a-310c will be further disclosed below in the context of which the functional modules 310a-310c may be used. In general terms, each functional module 310a-310c may be implemented in hardware or in software. Preferably, one or more or all functional modules 310a-310c may be implemented by the processing circuitry 310, possibly in cooperation with functional units 320 and/or 330. The processing circuitry 310 may thus be arranged to from the storage medium 330 fetch instructions as provided by a functional module 310a-310c and to execute these instructions, thereby performing any steps as will be disclosed hereinafter.

The network node 300 may be provided as a standalone device or as a part of at least one further device. For example, the network node 300 may be provided in a radio access network node 110, in another node of the radio access network, or in a node of the core network 130. Alternatively, functionality of the network node 300 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the radio access network than instructions that are not required to be performed in real time. In this respect, at least part of the network node 300 may reside in the radio access network, such as in the radio access network node 110, for cases when embodiments as disclosed herein are performed in real time.

Thus, a first portion of the instructions performed by the network node 300 may be executed in a first device, and a second portion of the of the instructions performed by the network node 300 may be executed in a second device; the herein disclosed embodiments are not limited to any particular number of devices on which the instructions performed by the network node 300 may be executed. Hence, the methods according to the herein disclosed embodiments are suitable to be performed by a network node 300 residing in a cloud computational environment. Therefore, although a single processing circuitry 310 is illustrated in FIG. 3a the processing circuitry 310 may be distributed among a plurality of devices, or nodes. The same applies to the functional modules 310a-310c of FIG. 3b and the computer program 420b of FIG. 4 (see below).

Figure 4:
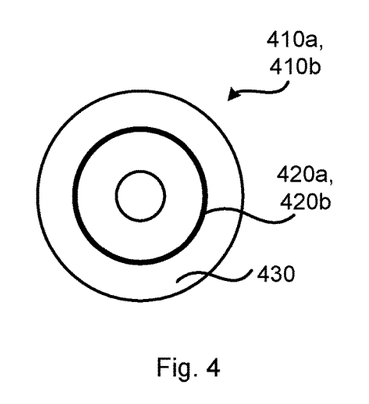
FIG. 4 shows one example of a computer program product comprising computer readable means according to an embodiment.

FIG. 4 shows one example of a computer program product 410a, 410b comprising computer readable means 430. On this computer readable means 430, a computer program 420a can be stored, which computer program 420a can cause the processing circuitry 210 and thereto operatively coupled entities and devices, such as the communications interface 220 and the storage medium 230, to execute methods according to embodiments described herein. The computer program 420a and/or computer program product 410a may thus provide means for performing any steps of the wireless device 200 as herein disclosed. On this computer readable means 430, a computer program 420b can be stored, which computer program 420b can cause the processing circuitry 310 and thereto operatively coupled entities and devices, such as the communications interface 320 and the storage medium 330, to execute methods according to embodiments described herein. The computer program 420b and/or computer program product 410b may thus provide means for performing any steps of the network node 300 as herein disclosed.

In the example of FIG. 4, the computer program product 410a, 410b is illustrated as an optical disc, such as a CD (compact disc) or a DVD (digital versatile disc) or a Blu-Ray disc. The computer program product 410a, 410b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 420a, 420b is here schematically shown as a track on the depicted optical disk, the computer program 420a, 420b can be stored in any way which is suitable for the computer program product 410a, 410b.

Figures 5, 6:
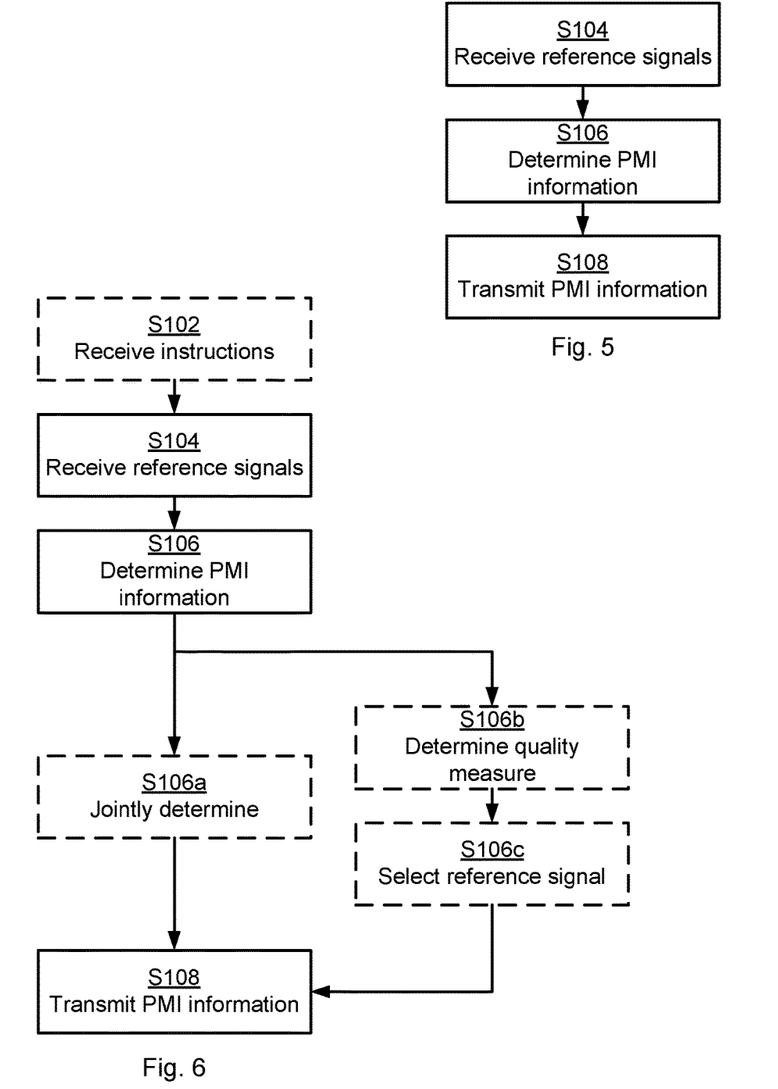
FIGS. 5, 6, 7, and 8 are flowcharts of methods according to embodiments.
Figure 7:
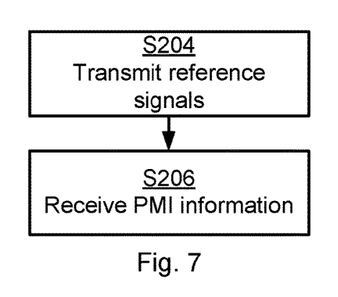
Figure 8:
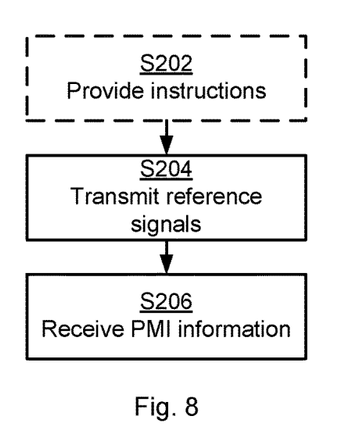

FIGS. 5 and 6 are flow charts illustrating embodiments of methods for PMI reporting for a set of ports as performed by the wireless device 200. FIGS. 7 and 8 are flow charts illustrating embodiments of methods for PMI reporting for a set of ports as performed by the network node 300. The methods are advantageously provided as computer programs 420a, 420b.

Reference is now made to FIG. 5 illustrating a method for PMI reporting for a set of ports as performed by the wireless device 200 according to an embodiment.

As will be further disclosed below, a network node 300 transmits reference signals. The wireless device 200 is therefore configured to, in a step S104, receive reference signals. The reference signals have been transmitted from a set of ports of the network node 300. Examples of such reference signals will be provided below. In this respect the receive module 210a may comprise instructions that when executed by the wireless device 200 causes the processing circuitry 210, possibly in collaboration with the communications interface 200 and the storage medium 230, to receive the reference signals in order for the wireless device 200 to perform step S104.

The wireless device 200 is configured to, in a step S106, determine PMI information for the received reference signals. Different embodiments of how the wireless device 200 can determine PMI information will be disclosed below. In this respect the determine module 210b may comprise instructions that when executed by the wireless device 200 causes the processing circuitry 210, possibly in collaboration with the communications interface 200 and the storage medium 230, to determine the PMI information in order for the wireless device 200 to perform step S106.

The wireless device 200 is then configured to, in a step S108, transmit the PMI information in a report to the network node 300. In this respect the transmit module 210C may comprise instructions that when executed by the wireless device 200 causes the processing circuitry 210, possibly in collaboration with the communications interface 200 and the storage medium 230, to transmit the PMI information in order for the wireless device 200 to perform step S108. The report thus defines the PMI information. The report comprises a combination of identifications of ports from the set of ports and identifications of the reference signals such that an identification of each port is paired with a respective identification of at most one of the reference signals. Different embodiments of what PMI information the report may comprise, and how the PMI information may be represented in the report, will be disclosed below.

Figure 10:
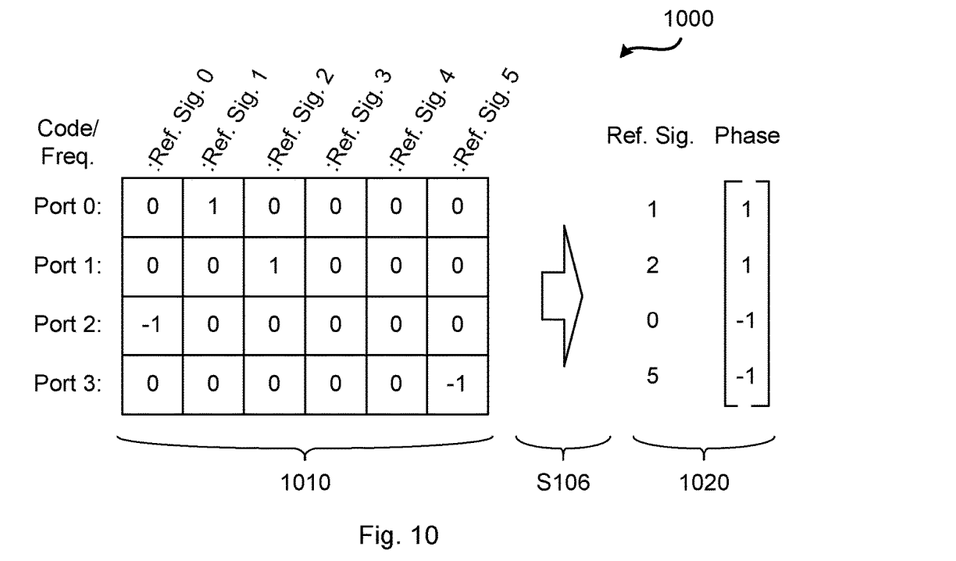
FIGS. 10, 11, and 12 are schematic illustration of precoding matrix indicator reporting according to embodiments.

FIG. 10 illustrates a report 1020 of PMI information determined as in step S106 from PMI information 1010, where in the PMI information 1010 only one entry per port is non-zero.

Reference is now made to FIG. 6 illustrating methods for PMI reporting for a set of ports as performed by the wireless device 200 according to further embodiments.

As will be further disclosed below, the network node 300 may provide the wireless device 200 with instructions how to report the PMI information. Hence, according to an embodiment the wireless device 200 is configured to, in a step S102, receive instructions how to report the PMI information from the network node 300. Further properties of these instructions and how the wireless device 200 may act on the instructions will be disclosed below with reference to the network node 300.

There may be different ways to provide the PMI information in the report. Different embodiments relating thereto will now be described in turn.

For example, the wireless device 200 can evaluate both which reference signal should be transmitted on each port (and/or which beam direction each ports should be transmitted in) and also how to combine the different ports; in some implementations a pre-coder is a beam-forming vector, comprising the phase offsets to use for the different ports to form a high gain antenna using the picked reference signals (and/or directions). Hence, according to an embodiment the PMI information comprises phase offset information related to the received reference signals such that each identification of at most one of the reference signals is paired with a phase offset value of the at most one of the reference signals.

Any type of precoder code-book could be used, for example comprising higher rank pre-coders rather than a rank 1 beam-former. But the precoder and reference signal reporting could be of any know type; given that for the subset of ports used for the PMI reporting, also a reference signal is given for each of the ports that the PMI information is calculated for. Hence the precoding can capture multipath channels. Hence, according to an embodiment the phase offset information has at least rank 2, and each identification of at most one of the reference signals is paired with as many phase offset values of the at most one of the reference signals as the rank.

A restriction on the PMI codebook based on the hardware limitation of the antenna systems of the network node 300 and the wireless device 200 can thereby be enforced. The reporting of the PMI information may thereby result in not allowing a precoding codebook to be selected that allows for beam combinations that are physically not available, i.e., not allowing reference signals (and/or beam directions) stemming from the same port to be used simultaneously. In the example in FIG. 1, there are n·m beams (150a, 150b, ..., 150n, 160a, 160b, ..., 160m) that the wireless device 200 measures. However, even though the number of combinations in theory is $2^{n \cdot m}$ (assuming binary phase shift keying (BPSK) precoder-elements and no ports turned off), the codebook is in this case restricted to n·m·6 entries at most, which is smaller than $2^{n \cdot m}$ for considered values of n and m. One codebook restriction can thus be formulated using a matrix representation of the precoder, as in FIG. 9, and requiring every row in the precoder matrix to have one (and only one) non-zero element. Other embodiments will be disclosed below.

In the more general case, one could use precoder-elements of higher granularity, say M-ary Phase Shift Keying (M-PSK) values. That is, each phase offset value can take a value from a binary set, such as from the binary set {−1,1}, or from a M-valued set, where M>2, such as from a set of M-PSK values.

Figure 11:
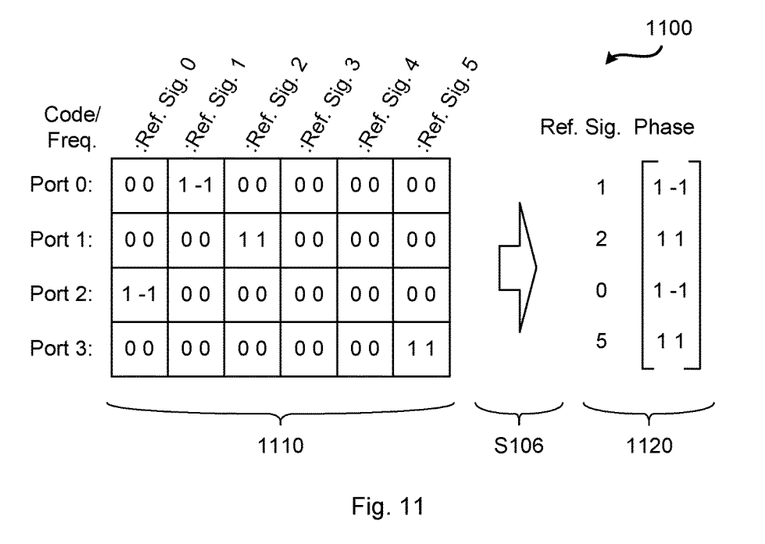

In some embodiments the number of selectable ports is further restricted. The restriction can, for example, be based on load and/or priority of wireless devices 200 served by the network node 200. Such restrictions could for example be that only N1 rows in the precoder matrix are allowed to have non-zero elements, where the integer N1 is a fixed or configurable. Hence, according to an embodiment the PMI information is transmitted for N1 number of ports of the set of ports, where N1 is a number smaller than the total number of ports, i.e., N1<N. Further, an identification of a port of the set of ports may only be paired with a non-zero valued identification of at most one of the reference signals. This could for example be the case if the network supports multi-user multiple-input multiple-output (MU-MIMO) communications and only a subset of the antenna chains at a network node is to be used for transmission towards one particular wireless device 200. Similar to above, higher rank PMI information could be used with the same system, as exemplified in FIG. 11 illustrating a report 1120 of PMI information determined as in step S106 from PMI information 1110.

According to an embodiment the wireless device 200 is configured with two sets of reference signals, inter alia for measuring channel state information by means of channel state information reference signals (CSI-RS). Each set of reference signals is sent at separate time instances, assuming that analog beam formers can only transmit one reference signal (and in one directional beam) at the time. The reference signals in the two sets of reference signals may or may not use the same coding and frequency resources. The wireless device 200 can then be configured to, based on e.g. a timer or an explicit request, report a precoder matrix over two ports and an indication of one reference signal from the first set of reference signals and the second set of reference signals for with the precoding was computed. That is, according to an embodiment the reference signals received in step S104 represent reference signals of two sets of reference signals, and each combination of identifications of ports from the set of ports and the identifications of the reference signals in the PMI report identifies a reference signal from only one of the two sets of reference signals.

The selection of precoder and reference signal can be performed jointly or sequentially in the wireless device 200. Hence, according to an embodiment, determining the PMI information for the received reference signals involves the wireless device 200 to, in a step S106a, jointly determine which reference signal from the received reference signals to be paired with which port from the set of ports. For example, the wireless device 200 can search the best possible combination of reference signal and precoder. Alternatively, the wireless device 200 can first search for the reference signal with most energy, and then find the best precoder for these reference signals. Hence, according to an embodiment, determining the PMI information for the received reference signals involves the wireless device 200 to, in a step S106b, determine, for each port of the ports, a quality measure for each received reference signal; and, in a step S106c, select, per each port, the reference signal having best quality measure. The wireless device 200 can yet alternatively be configured to perform a hybrid of steps S106a, S106b, and S106c.

The PMI information in the report can be provided as an index to a matrix. In more detail, the selected references signal per set can be signaled as an array of indexes or jointly coded using a hash-function. The precoder matrix can be signaled as an explicit matrix or a pointer or index of a pre-tabulated matrix selected from a set of possible matrices. Hence, according to an embodiment the PMI information in the report is provided as an array or as a pointer to an index of a pre-tabulated array selected from a set of possible pre-tabulated arrays. The selected reference signals and the precoding matrix can also be jointly encoded or selected from a code-book of possible combination. That is, according to an embodiment the PMI information in the report is provided as an array of indexes of identifications of ports and reference signals or as a hash function of the identifications of ports and reference signals.

In some embodiments the reporting of selected reference signals and precoder is performed jointly; in other embodiments separate reporting is performed. In some embodiment the frequency of reporting selected reference signals is lower than the frequency of reporting the PMI information. In some such embodiments the network node 300 is configured only to transmit all reference signals in some of the measurement occasions and in the others only transmit a sub-set containing the selected reference signals. Hence, according to an embodiment, phase offset information is provided either in the report or separately from the report. And according to an embodiment the phase offset information is provided more frequently than the report to the network node.

The wireless device 200 can be configured with more than two sets of reference signals, e.g. N2 sets of reference signals. The wireless device 200 may then be configured to select at most N2 reference signals, at most one per set, and a precoder over all selected reference signals. Hence, according to an embodiment the received reference signals define N2 number of sets of reference signals, and the report comprises at most one identification of a reference signal from each respective set of reference signals and in total at most N2 identifications of the reference signals. In an embodiment exactly one reference signal per set of reference signals is reported. In other embodiments the wireless device 200 is configured, or imposed, to select only reference signals from at most K (where K is an integer smaller than M, i.e., K<M) of the sets of reference signals. For example, the wireless device 200 can, based on a rule, select up to N (or K) reference signals but may select less if they do not significantly contribute to improving the signal quality.

In an embodiment there are further restrictions on how PMI reports on reference signals from separate sets of reference signals are reported. One example of such a restriction is that the sets of reference signals are grouped in two and two, where the same reference signal index (or some other one-to-one mapping) is selected from each set. Hence, according to an embodiment, each identification of one of the reference signals is paired with phase offset values for at least two different ports.

Figure 12:
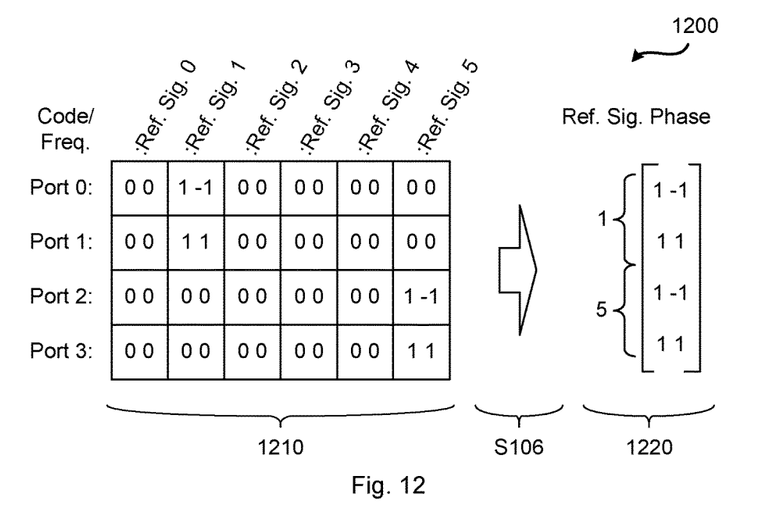

This could for example be due to the reference signals being transmitted using two different polarizations in two different sets of reference signals, but where all reference signals originate from the same antenna. It may further be assumed that the spatial direction/beamformer of the two polarizations is the same. This restriction can be realized as an explicit signaling or a restriction in the reporting format or codebook. Hence in this case multiple ports would be combined in the reporting. For example, ports 0,1 could be jointly reported (e.g. the two polarizations from a first antenna) and ports 2,3 (e.g. the two polarizations from a second antenna) could be jointly reported as exemplified in FIG. 12 illustrating a report 1220 of PMI information determined as in step S106 from PMI information 1210.

Reference is now made to FIG. 7 illustrating a method for PMI reporting for a set of ports as performed by the network node 300 according to an embodiment.

The network node 300 is configured to, in a step S204, transmit reference signals on a set of ports of the network node 300. In this respect the transmit module 310a may comprise instructions that when executed by the network node 300 causes the processing circuitry 310, possibly in combination with the communications interface 320 and the storage medium 330, to transmit the reference signals in order for the network node 300 to perform step S204.

As disclosed above, the reference signals are assumed to be received by the wireless device 200 which, as also disclosed above, transmits PMI information of the reference signals in a report to the network node 300. The network node 300 is therefore configured to, in a step S206, receive the PMI information in a report from the wireless device 200 for the set of ports. In this respect the receive module 310b may comprise instructions that when executed by the network node 300 causes the possibly in combination with the communications interface 320 and the storage medium 330, to receive the PMI information in the report in order for the network node 300 to perform step S206. As disclosed above, the report comprises a combination of identifications of ports from the set of ports and identifications of the reference signals such that an identification of each port is paired with a respective identification of at most one of the reference signals.

As noted above, the reference signals can act as measurement resources during the determination of the PMI information. Further, each reference signal may correspond to a respective beam direction of the network node 300, where the network node 300 is configured to transmit reference signals in beams.

Further, the ports may be associated with independently steerable antenna-chains of the network node 300. That is, each port can be associated with a respective independently steerable antenna chain at the network node 300. A port can thus be defined by one antenna panel with co-polarized antennas, the antennas having the same polarization in one antenna panel with cross-polarized antennas (i.e. half the panel), all the antennas in one antenna panel with cross-polarized antennas, and so on. That is, each port can correspond to one antenna panel with co-polarized antennas.

Reference is now made to FIG. 8 illustrating methods for PMI reporting for a set of ports as performed by the network node 300 according to further embodiments.

According to an embodiment the network node 300 is configured to, in a step S202, provide the wireless device 200 with instructions how to report the PMI information. The network node 300 may thereby provide configuration information to the wireless device 200. The network node 300 may thereby further provide information regarding how the network node 300 is to transmit the reference signals so that the wireless device 200 can adapts it reception of the reference signals accordingly.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for precoding matrix indicator, PMI, reporting for a set of ports, the method being performed by a wireless device, the method comprising:
   receiving reference signals, the reference signals having been transmitted from a set of ports of a network node;
   determining PMI information for the received reference signals; and
   transmitting the PMI information in a report to the network node, the report comprising a combination of identifications of ports from the set of ports and identifications of the reference signals such that an identification of each port is paired with a respective identification of at most one of the reference signals.

2. The method according to claim 1, wherein the PMI information comprises phase offset information related to the received reference signals such that each identification of at most one of the reference signals is paired with a phase offset value of said at most one of the reference signals.

3. The method according to claim 2, wherein said phase offset information has at least rank 2, and wherein each identification of at most one of the reference signals is paired with as many phase offset values of said at most one of the reference signals as the rank.

4. The method according to claim 2, wherein each identification of one of the reference signals is paired with phase offset values for at least two different ports.

5. The method according to claim 2, wherein each phase offset value takes a value from a binary set, such as from the binary set {−1, 1}, or from a M-valued set, where M>2, such as from a set of M-ary Phase Shift Keying, M-PSK, values.

6. The method according to claim 2, wherein said phase offset information is provided to the network node in at least one of:
   said report or separately from said report; and
   more frequently than said report.

7. The method according to claim 1, wherein the PMI information is transmitted for N number of ports of the set of ports, where N is a number smaller than the total number of ports.

8. The method according to claim 1, wherein an identification of a port of the set of ports only is paired with a non-zero valued identification of at most one of the reference signals.

9. The method according to claim 1, wherein the reference signals represent reference signals of two sets of reference signals, and wherein each combination of identifications of ports from the set of ports and the identifications of the reference signals identifies a reference signal from only one of the two sets of reference signals.

10. The method according to claim 1, wherein determining said PMI information for the received reference signals comprises:
    jointly determining which reference signal from the received reference signals to be paired with which port from the set of ports.

11. The method according to claim 1, wherein determining said PMI information for the received reference signals comprises:
    determining, for each port of the ports, a quality measure for each received reference signal; and
    selecting, per each port, the reference signal having best quality measure.

12. The method according to claim 1, wherein said PMI information in said report is provided as an array of indexes of identifications of ports and reference signals or as a hash function of said identifications of ports and reference signals.

13. The method according to claim 1, wherein the PMI information in the report is provided as an index to a matrix.

14. The method according to claim 1, wherein said PMI information in said report is provided as an array or as a pointer to an index of a pre-tabulated array selected from a set of possible pre-tabulated arrays.

15. The method according to claim 1, wherein the received reference signals define N number of sets of reference signals, and wherein the report comprises at most one identification of a reference signal from each respective set of reference signals and in total at most N identifications of the reference signals.

16. The method according to claim 1, wherein at least one of:
    the reference signals act as measurement resources during the determination of the PMI information; and
    each reference signal corresponds to a respective beam direction.

17. The method according to claim 1, further comprising:
    receiving instructions how to report said PMI information from the network node.

18. A method for precoding matrix indicator, PMI, reporting for a set of ports, the method being performed by a network node, the method comprising:
    transmitting reference signals on a set of ports; and
    receiving PMI information in a report from a wireless device for the set of ports, the report comprising a combination of identifications of ports from the set of ports and identifications of the reference signals such that an identification of each port is paired with a respective identification of at most one of the reference signals.

19. The method according to claim 18, further comprising:
    providing said wireless device with instructions how to report said PMI information.

20. The method according to claim 18, wherein each reference signal corresponds to a respective beam direction.

21. The method according to claim 18, wherein each port is associated with a respective independently steerable antenna chain at the network node.

22. The method according to claim 18, wherein each port corresponds to one antenna panel with co-polarized antennas.

23. A wireless device for precoding matrix indicator, PMI, reporting for a set of ports, the wireless device comprising processing circuitry, the processing circuitry being configured to cause the wireless device to:
receive reference signals, the reference signals having been transmitted from a set of ports of a network node;
determine PMI information for the received reference signals; and
transmit the PMI information in a report to the network node, the report comprising a combination of identifications of ports from the set of ports and identifications of the reference signals such that an identification of each port is paired with a respective identification of at most one of the reference signals.

24. A network node for precoding matrix indicator, PMI, reporting for a set of ports, the network node comprising processing circuitry, the processing circuitry being configured to cause the network node to:
transmit reference signals on a set of ports; and
receive PMI information in a report from a wireless device for the set of ports, the report comprising a combination of identifications of ports from the set of ports and identifications of the reference signals such that an identification of each port is paired with a respective identification of at most one of the reference signals.

25. A non-transitory computer storage medium storing a computer program for precoding matrix indicator, PMI, reporting for a set of ports, the computer program comprising computer code which, when run on processing circuitry of a wireless device, causes the wireless device to:
receive reference signals, the reference signals having been transmitted from a set of ports of a network node;
determine PMI information for the received reference signals; and
transmit the PMI information in a report to the network node, the report comprising a combination of identifications of ports from the set of ports and identifications of the reference signals such that an identification of each port is paired with a respective identification of at most one of the reference signals.

26. A non-transitory computer storage medium storing a computer program for precoding matrix indicator, PMI, reporting for a set of ports, the computer program comprising computer code which, when run on processing circuitry of a network node, causes the network node to:
transmit reference signals on a set of ports; and
receive PMI information in a report from a wireless device for the set of ports, the report comprising a combination of identifications of ports from the set of ports and identifications of the reference signals such that an identification of each port is paired with a respective identification of at most one of the reference signals.

* * * * *